(12) United States Patent
Hutchings

(10) Patent No.: US 12,168,750 B2
(45) Date of Patent: Dec. 17, 2024

(54) METHOD AND COMPOSITION FOR SUBSURFACE WELL INTERVENTION TO REDUCE WELL FLUID LOSS

(71) Applicant: RheoVest, LLC, Shreveport, LA (US)

(72) Inventor: Nathan R. Hutchings, Shreveport, LA (US)

(73) Assignee: RheoVest, LLC, Shreveport, LA (US)

( * ) Notice: Subject to any disclaimer, the term of this patent is extended or adjusted under 35 U.S.C. 154(b) by 97 days.

(21) Appl. No.: 18/055,323

(22) Filed: Nov. 14, 2022

(65) Prior Publication Data

US 2024/0158685 A1    May 16, 2024

(51) Int. Cl.
*C09K 8/44*     (2006.01)
*C09K 8/035*    (2006.01)
*E21B 21/00*    (2006.01)

(52) U.S. Cl.
CPC .............. *C09K 8/44* (2013.01); *C09K 8/035* (2013.01); *E21B 21/003* (2013.01)

(58) Field of Classification Search
None
See application file for complete search history.

(56) References Cited

U.S. PATENT DOCUMENTS

| | | | |
|---|---|---|---|
| 5,881,826 A * | 3/1999 | Brookey | C09K 8/5758 507/202 |
| 6,770,601 B1 | 8/2004 | Brookey | |
| 7,726,400 B2 | 6/2010 | Zusar et al. | |
| 8,746,339 B2 | 6/2014 | Murphy et al. | |
| 8,985,212 B1 * | 3/2015 | Crespo | C09K 8/588 166/305.1 |
| 9,394,779 B2 | 7/2016 | Nelson | |
| 9,587,469 B2 | 3/2017 | Miller | |
| 9,695,353 B2 | 7/2017 | Nelson et al. | |
| 10,000,681 B2 | 6/2018 | Livanec et al. | |
| 10,060,205 B2 | 8/2018 | De Stefano et al. | |
| 10,094,181 B2 | 10/2018 | May et al. | |
| 10,106,718 B2 | 10/2018 | Villareal, Jr. et al. | |
| 10,273,401 B2 | 4/2019 | Sun et al. | |
| 10,662,361 B2 | 5/2020 | Livanec et al. | |
| 10,723,939 B2 | 7/2020 | Beuterbaugh et al. | |
| 10,988,683 B2 | 4/2021 | Zhou et al. | |
| 2002/0040812 A1 | 4/2002 | Heying | |
| 2006/0234871 A1 * | 10/2006 | Dalrymple | C09K 8/46 507/219 |
| 2011/0094746 A1 * | 4/2011 | Allison | C09K 8/424 166/308.5 |

(Continued)

OTHER PUBLICATIONS

International Search Report and Written Opinion dated Apr. 2, 2024, for International Patent Application No. PCT/US2023/079454.

(Continued)

*Primary Examiner* — Andrew Sue-Ako
(74) *Attorney, Agent, or Firm* — Richard A. Fagin

(57) ABSTRACT

A composition for lost circulation material (LCM) usable in subsurface well intervention includes particles of a hydrated superabsorbent polymer (SAP) mixed with an aqueous solution of a salt tolerant osmotic barrier polymer. A method for stopping fluid loss from a well into a formation penetrated by the well includes pumping a selected volume of the composition into the well until the selected volume is adjacent to the formation.

27 Claims, 5 Drawing Sheets

(56) References Cited

U.S. PATENT DOCUMENTS

| | | | |
|---|---|---|---|
| 2011/0118381 A1 | 5/2011 | Fang et al. | |
| 2014/0158355 A1* | 6/2014 | Wuthrich et al. | |
| 2016/0289541 A1* | 10/2016 | Zhou | C09K 8/34 |
| 2017/0218256 A1* | 8/2017 | Parton | C09K 8/582 |
| 2018/0306006 A1 | 10/2018 | Gupta et al. | |
| 2021/0087460 A1* | 3/2021 | Shen | C09K 8/685 |
| 2022/0111339 A1 | 4/2022 | Appleton et al. | |

OTHER PUBLICATIONS

Zhu et al, A high-temperature resistant colloid gas aphron drilling fluid system prepared by using a novel graft copolymer xanthan gum-AN AM/AMPS, Journal of Petroleum Science and Engineering, vol. 205. Apr. 24, 2021 [retrieved on Feb. 6, 2024]. Retrieved from the internet: <URL: https://www.sciencedirect.com/science/article/pii/S0920410521004824>. pp. 1-14.

Zhao et al., Salt-Tolerant Superabsorbent Polymer with High Capacity of Water-Nutrient Retention Delived from Sulfamic Acid-Modi#ed Starch, ACS Omega, vol. 4, Mar. 28, 2019. pp. 5923-5930.

* cited by examiner

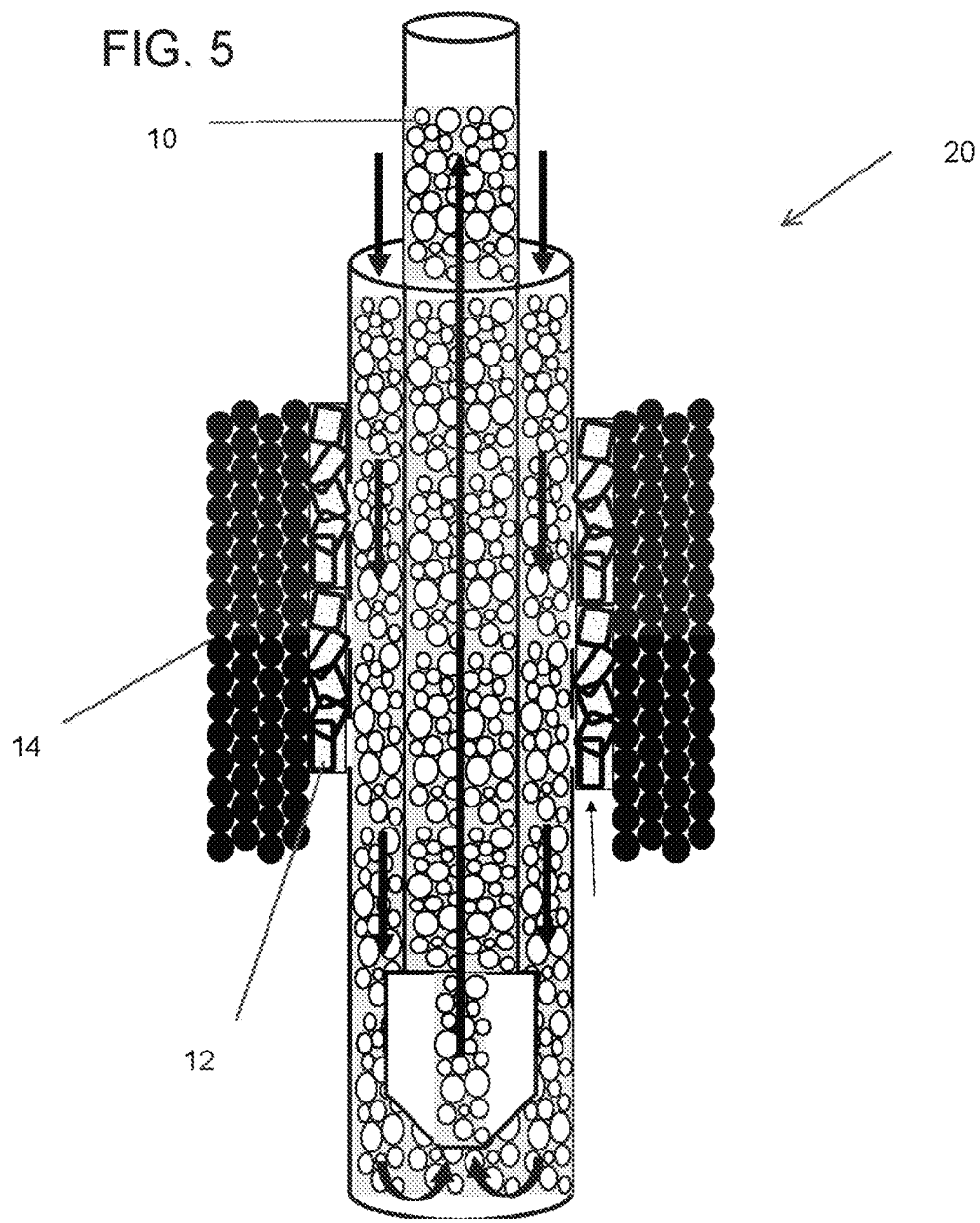

METHOD AND COMPOSITION FOR SUBSURFACE WELL INTERVENTION TO REDUCE WELL FLUID LOSS

CROSS REFERENCE TO RELATED APPLICATIONS

Not Applicable.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of subsurface well operations to affect the well structure and/or formations penetrated by the well, referred to by the general term well "intervention." More specifically, the disclosure relates to compositions of material to reduce or stop fluid loss from the well to the formations and methods for using such compositions.

Subsurface wells such as those used to extract oil and gas may be subject to intervention using various devices to move tools and equipment into and out of the well such as coiled tubing—or a hoisting unit, which may convey jointed tubing known as a "rig." Coiled tubing and rigs may comprise pumps to move fluid into the well through the tubing. Continued fluid pumping through the tubing causes the fluid to return to surface in an annular space between the tubing and the well and recover the fluid at the surface, or continued pumping down the annular space between the casing and tubing causes the fluid to return to surface up the tubing (Such fluid movement is referred to as "circulating" the fluid forward or reverse, respectively with reference to direction of the fluid movement. Circulation is frequently performed during intervention in order to lubricate the tubing and tooling as well to carry debris out of the well to enable the tubing to move freely throughout the well bore thereby enabling completion of the intervention procedure.

Some wells on which intervention is to be performed may penetrate formations known as "low pressure" formations. The term "low pressure" in this context means fluid pressure in subsurface formations that is less than the hydrostatic pressure of a column of liquid (e.g., water) extending from surface to the vertical depth of the formation. Such low pressure formations may have had low original fluid reservoir formation pressure and/or may have had reservoir formation pressure depleted resulting from fluid production over time. Low pressure wells are particularly challenging to conduct well intervention because the low pressure results in inability of fluid in the formation to effectively overcome the hydrostatic pressure of fluid in the well, thereby restricting the ability to circulate fluids and debris out of the well when needed. To successfully maintain fluid circulation in low pressure well intervention generally involves reducing the hydrostatic pressure in the well by using a gas-liquid fluid mixture, placing a physical barrier at the wellbore/perforation interface to temporarily reduce fluid loss to the reservoir formation, or combinations thereof.

A common practice in low pressure well intervention is to use for well circulating fluid a mixture of water and nitrogen, with or without surfactants that form foam, to reduce the hydrostatic pressure in the well sufficiently to maintain circulation. However, in many applications, these gas-liquid mixtures have insufficient rheological properties to both sufficiently reduce the hydrostatic pressure to the necessary value to establish circulation and effectively carry debris, such as sand/proppant slough, fracture plug debris, and/or mineral scale to the surface.

More recently, the use of lost circulation material (LCM) has become more common, either alone or in combination with liquid-gas mixtures for low-pressure well interventions. LCM compositions known in the art to be used in well completion and formation fluid production in cased wells typically comprise solid particulate materials that form a temporary or reversible seal against openings (perforations) in the casing. Perforations otherwise hydraulically connect the well to the reservoir and/or to the proppant surface in wells in which the formation has been hydraulically fractured. Unlike LCMs used in well drilling (open hole applications), the LCM materials used in completed wells should only form a temporary seal as it is undesirable to permanently impair flow between the perforations in the casing and the reservoir. Additionally, these LCMs used in well intervention will often be deployed through a bottom-hole tool assembly consisting of back-pressure valves, agitators, hydraulic motors, bit/mill, and/or other tools, some components of which have small tolerances in contrast to conventional drilling tools. Examples of LCMs used in completed well intervention include acid-soluble silica fibers, acid-soluble mineral powders or metal oxides, and temperature-dependent low-melt point plastics or elastomers. Challenges associated with the use of LCMs in completion include difficulties controlling the placement of the LCM into the perforations, difficulties maintaining an effective low fluid-leak-off seal throughout the duration of the intervention, and difficulties removing the LCM after the intervention is complete.

Some of the limitations of using low-melt plastics or elastomers in completed well intervention are directly related to temperature-dependent properties of these materials. If the well has sufficiently high bottom-hole temperature, the plastics will g melt too quickly, resulting in a premature loss of the sealing properties and creating the need to apply additional material throughout the procedure to maintain the seal. If the well has insufficient bottom hole temperatures, the plastics will not sufficiently melt at the end of the procedure, resulting in challenges removing the material from the well; and with insufficient bottom hole temperatures, the material may not sufficiently soften after placement to form an effective seal.

Some of the limitations of acid-soluble fibers are related to the physical properties of fibers. Fibers tend to form a bird's nest or web-like matrix that functions more like a filter than a block, reducing leak-off but not completely stopping it. Those same properties can lead to clumps of entangled fibers clogging surface equipment and/or downhole tooling which can limit the methods appropriate for pumping this material into the well.

Mineral salts and metal oxides are not soft and pliable, but rather abrasive, which can be damaging to tubulars and surface equipment. Since they are not pliable, getting an effective seal can be difficult as the particles don't compress completely into an impermeable matrix. The mineral nature of these materials can also become a nucleation source for scale formation which can potentially result in damage to the well/reservoir when these materials interact with produced fluids, particular mineral-laden salt water from the reservoir.

Other materials being developed for forming temporary seals in oil and gas wells are a certain type of cross-linked polymer hydrogel, e.g., superabsorbent polymers (SAPs). SAPs are used to absorb water and swell into pliable, water-saturated bead-like particles. The cross-linked nature of the polymer matrix keeps individual particles of the SAP discrete; and depending on the specific chemistry of the polymer, SAPs can swell from ten to three hundred times their equivalent dehydrated size as they absorb water. There are several advantages to utilizing SAPs for temporary fluid loss prevention in completed wells. First, the composition of a fully-hydrated SAP particle is between 90% and >99% water. Thus a few grams of SAP "solid material" can have the same volume when hydrated (fills the same void space) asseveral pounds of low-melt plastic or acid-soluble fiber. Introducing less physical material into the well to effectively cover the same area reduces the likelihood of damage to the well and reservoir formation. Second, the resulting hydrated polymer beads are very soft and pliable. Not only does that eliminate the abrasiveness and potential damage to equipment, it also enables these beads to conform into the void spaces when pressure is applied. That results in a "shingle-like" effect which will repel fluid losses more effectively than the "filter-like" effect of less pliable materials Third, SAP polymers can be synthesized with temperature stability in excess of 400 F, which means they will not melt or decompose at bottom-hole temperatures. Fourth, most SAPs can be very effectively dissolved by the use of common oxidizing agents such as persulfate or peroxide based chemicals. The ability to fully dissolve the material at the end of the job increases connectivity between the casing and the reservoir and reduces the likelihood of damage to the well or reservoir after the job.

However, the some of the limitations of SAPs are consequences of their hydrophilic nature. To maximize hydration (swelling), SAPs generally require water with a very low salt concentration (e.g., fresh water <500 ppm total dissolved solutes). Fresh water-hydrated SAPs are sensitive to osmotic pressure when introduced to other fluids containing salts (e.g., formation-produced water), which will cause them to shrink. Depending on the strength of the osmotic gradient, this shrinkage can range from 20%-90% loss in particle size depending on the salt concentration (e.g., osmotic gradient pressure). Additionally, the soft and pliable nature of hydrated SAP particles (while an advantage for forming an effective seal) also makes these particles more sensitive to shear-degradation. Care must be taken when pumping these materials through high-shear points (pumps, tight orifices, etc.) to avoid over-shearing the particles thereby rendering the individual particles smaller which may increase the amount of SAP necessary to effectuate a fluid-loss seal. Thus, while SAPs have some significant advantages over other LCMs, there is a need for improvement to the composition of SAPs to expand their effectiveness and versatility.

Another fluid system recently developed for low-pressure well interventions is the colloidal gas aphron (CGA) fluids, which are specialized mixtures of polymers, surfactants, and gas to form structuralized microbubble foams. The presence of the structuralized microbubbles, which average less than 100 microns in diameter, not only reduces the density of the fluid but also may work as a weak LCM as the microbubbles form an air-bubble barrier against the formation or proppant pack (solid particles pumped into the formation to hold open hydraulic fractures) Additionally, the colloidal size of the microbubbles in a viscous fluid modifies the rheology of the fluid to behave like a Bingham plastic fluid, meaning the fluid has a rheological profile much like a drilling mud (e.g. greater debris carrying capacity compared to pseudoplastic conventional foams). CGA fluids and micro-foams have been used in many industries, including in oil and gas drilling and well interventions; however, those applications have been limited by how much the fluid density can be reduced. U.S. Pat. No. 6,770,601 issued to Brookey discloses the use of CGA fluids for well interventions; the density range of the fluid disclosed is limited to a maximum gas content of 20%, preferably 15% or less. If fresh water is used at the initial base fluid, with a density of 8.34 pounds per gallon (lbs/gal), the lowest density obtainable using the disclosed CGA compositions would be between 7.1 and 6.72 lbs/gallon. While the combination of somewhat reduced density and leak-off control with Bingham Plastic fluids represents an improvement over conventional liquid-gas LCM systems, there are many wells in which the CGA fluids disclosed in the '601 patent U.S. Pat. No. 6,770,601 cannot be used because of the extremely low reservoir pressure of these wells and the limitations on density reduction available using the disclosed CGA fluids. Even at the low density limit of these fluids, the hydrostatic overburden in many wells would be so great that it would overcome the LCM-like behavior of the microbubbles, resulting in total loss of circulation in the well. In Hutchings et.al., US Patent Application Publication No. 2022/0111339 A1, expanded the achievable density range for CGA to over 50% gas content (e.g., <4 lbs/gal fluid density) via the use of novel means to entrain the air directly into the fluid within the surface piping. And while doing so increases the number of wells that can be circulated with CGA fluids, there are still thousands of producing wells with insufficient reservoir pressure (e.g. pressure depletion) that even 4 lbs/gal fluid will still represent a significant hydrostatic pressure overburden resulting in excessive fluid losses.

Thus, in order to effectively intervene in low pressure completions or production wells, a material is required that accomplishes: reducing the hydrostatic pressure burden (e.g. fluid density), reversibly seals and prevents fluid losses to low pressure areas within the completed interval(s) of the well, and maintains the enhanced rheological benefits of a Bingham plastic fluid to facilitate debris removal from the wellbore during the intervention. Such a material would enable significant intervention cost reductions and improve production from thousands of existing, mature oil and gas wells.

SUMMARY

One aspect of the present disclosure is a composition for lost circulation material (LCM) usable in subsurface well intervention. A composition according to this aspect of the disclosure includes particles of a hydrated superabsorbent polymer (SAP) mixed with an aqueous solution of a salt tolerant osmotic barrier polymer to form a suspension.

In some embodiments, the SAP comprises cross-linked polyacrylamide, polyacrylate, or polyacrylate-acrylamide co-polymer.

In some embodiments, a particle size of the hydrated SAP is a range of 0.1 to 5 millimeters.

In some embodiments, wherein the SAP comprises a cross-linked, charge-modified starch or cross-linked, charge modified cellulose.

In some embodiments, a concentration of the SAP in the suspension is in a range of 0.05 to 5 pounds per barrel (42 gallons).

In some embodiments, the SAP is hydrated using fresh water (total dissolved solids less than 2000 parts per million).

In some embodiments, the SAP is susceptible to degradation by an oxidizing agent comprising one or more of peracetic acid, ammonium persulfate, peroxide, or sodium persulfate.

In some embodiments, the salt tolerant osmotic barrier polymer comprises one or more of linear polyacrylamide, branched polyacrylamide, polyacrylamide-acrylamide tertiary butyl sulfonic acid co-polymer, xanthan gum, guar gum, derivatized guar gum, cellulose polymer, or derivatized cellulose polymer.

Some embodiments further comprise a colloidal gas aphron (CGA) mixed with the hydrated SAP and salt tolerant osmotic barrier polymer to reduce a density of the composition.

In some embodiments, the CGA comprises a mixture of at least one viscosifying polymer and at least one surfactant.

In some embodiments, the at least one viscosifying polymer comprises xanthan gum.

In some embodiments, the at least one viscosifying polymer comprises one or more of linear polyacrylamide, branched polyacrylamide, or polyacrylamide-acrylamide tertiary butyl sulfonic acid co-polymer.

In some embodiments, the at least one surfactant comprises at least one of an anionic surfactant, a non-ionic surfactant, a zwitterionic surfactant, or a cationic surfactant.

In some embodiments, the SAP is susceptible to degradation by an oxidizing agent comprising one or more of as peracetic acid, ammonium persulfate, peroxide, or sodium persulfate.

A method for stopping fluid loss from a well into a formation penetrated by the well according to another aspect of the present disclosure includes pumping a selected volume of a composition into the well until the selected volume is adjacent to the formation. The composition comprises particles of a hydrated superabsorbent polymer (SAP) mixed with an aqueous solution of a salt tolerant osmotic barrier polymer.

Some embodiments further comprise, removing the composition from the well after the composition is pumped into the well.

In some embodiments, the removing comprises reducing a fluid pressure in the well to cause fluid from the formation to enter the well.

In some embodiments, the removing comprises pumping an oxidizing agent into the well until the oxidizing agent contacts In some embodiments, the composition, In some embodiments, the oxidizing agent comprises one or more of peracetic acid, ammonium persulfate, peroxide, or sodium persulfate.

Some embodiments further comprise mixing a colloidal gas aphron (CGA) with the composition to reduce a density of the composition.

In some embodiments, the SAP comprises cross-linked polyacrylamide.

In some embodiments, the SAP comprises cross-linked polyacrylate.

In some embodiments, the SAP comprises cross-linked polyacrylamide-polyacrylate copolymer.

In some embodiments, the salt tolerant osmotic barrier polymer comprises one or more of linear polyacrylamide, branched polyacrylamide, polyacrylamide-acrylamide tertiary butyl sulfonic acid co-polymer, xanthan gum, guar gum, derivatized guar gum, cellulose polymer, or derivatized cellulose polymer.

Other aspects and possible advantages will be apparent from the following description and claims.

BRIEF DESCRIPTION OF THE DRAWINGS

FIGS. 4 and 5 show, respectively views corresponding to FIGS. 2 and 3, wherein the circulation is in the reverse direction from that shown in FIGS. 2 and 3.

DETAILED DESCRIPTION

Figure 1:
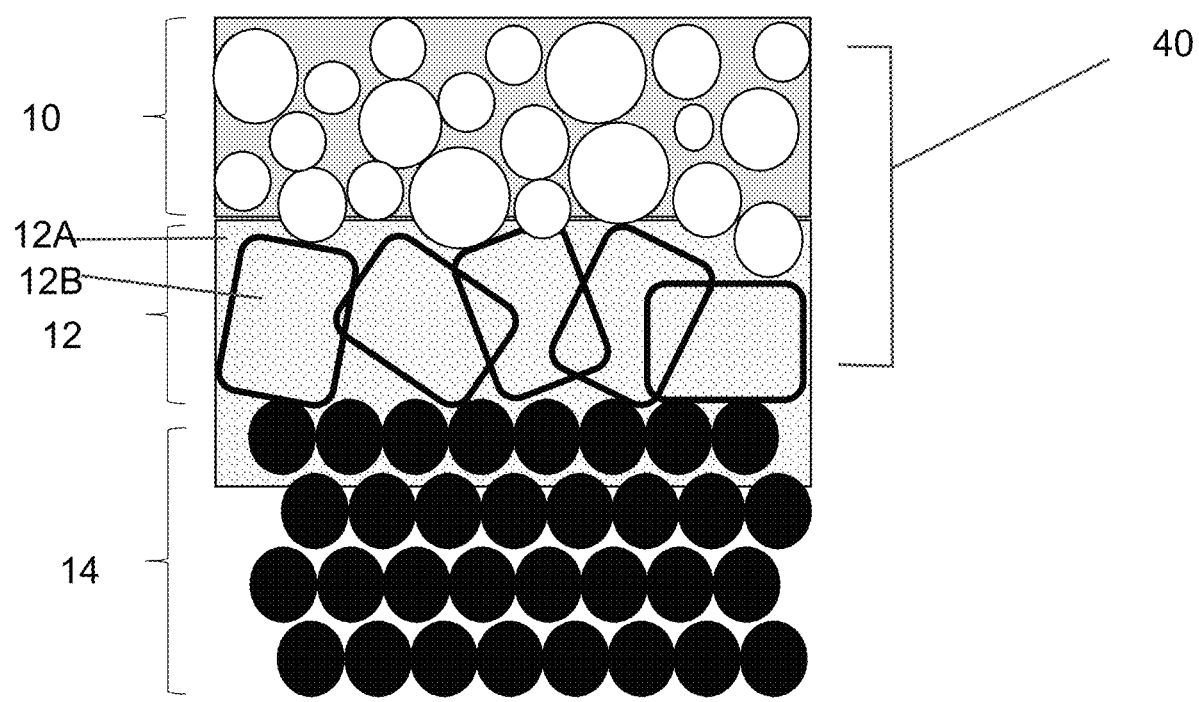
FIG. 1 shows an expanded cross-sectional view of a well pipe or casing in a well and adjacent subsurface formation to illustrate placement of a composition according to the present disclosure to provide a fluid seal.

A composition for use as a lost circulation material (LCM) in subsurface well intervention may provide a seal to reduce or stop fluid loss from a subsurface well into earthen formations penetrated by the well where such formations have a fluid pressure less than a fluid pressure in the well. The seal may be obtained by pumping a predetermined volume, called a "pill" or a slug of the composition into the well until the pill or slug is located adjacent to the relevant formation(s) in the well. The composition acts to seal openings in the well to close hydraulic communication between the interior of the well and the particular formation. The composition may be removed after it is no longer needed by either, reducing the well fluid pressure so that formation fluid, which generally includes saline water, enters the well and causes the composition to shrink in volume, and/or by pumping an oxidizing agent into the well to remove the composition by a chemical reaction.

Compositions according to the present disclosure comprise particles of a superabsorbent polymer (SAP), suspended in an aqueous solution of a salt-tolerant osmotic barrier polymer. The SAP is hydrated before mixing with the aqueous solution of the salt tolerant osmotic barrier polymer. Superabsorbent polymers are cross-linked hydrophilic polymers which can retain absorbed water under pressure due to an equilibrium balance of dissolution and thermodynamically favored expansion of polymer chains constrained by crosslinking structure. See, for example, Masuda, F., Ueda, Y. (2014). *Superabsorbent Polymers*, in: Kobayashi, S., Müllen, K. (eds), *Encyclopedia of Polymeric Nanomaterials*, Springer, Berlin, Heidelberg.

SAPs suitable for use in the present composition and method, in contrast to other cross-linked polymers, are cross-linked during the process of synthesizing the polymer such that when later hydrated, the individual cross-linked polymer molecules remain as physically discrete particles. The SAP particles thus form hydrated "beads" or a slushy gel-like consistency. The degree of swelling of the SAP by hydration is related to the charge density of the polyelectrolyte portion of the polymer molecule, the degree and nature of the crosslinking agent used during synthesis, and the ionic strength of the fluid in which the SAP is ultimately hydrated. For purposes of the present disclosure, the degree of swelling (weight of absorbed "fresh" water) should exceed the mass of the individual polymer granule by at least ten times. In contrast, hydrophylic polymers that are cross-linked after synthesis and subsequent hydration tend to form "slabs" of a hydrogel, not beads, and do not generally have the same water absorption capacity of SAPs. Test results with equivalent volumes of fiber and SAP resulted in the SAP holding as much as 50% more pressure overburden with as much as 80% less leak off than LCM materials known in the art.

In the composition disclosed herein, protecting the SAP with a viscous and salt-tolerant osmotic barrier polymer creates a protective matrix on the SAP particles that insulates the hydrated SAP particles from water intrusion and the associated osmotic gradient, thereby enabling the SAP to maintain its hydrated particle size and physical properties (and effective seal) longer. In some embodiments, the salt tolerant osmotic barrier polymer comprises one or more of linear polyacrylamide, branched polyacrylamide, polyacrylamide-acrylamide tertiary butyl sulfonic acid co-polymer, xanthan gum, guar gum, derivatized guar gum, cellulose polymer, or derivatized cellulose polymer.

In cases where the formation fluid pressure is below the lowest hydrostatic pressure that can be resisted by a the SAP and the osmotic barrier polymer composition alone, the density of the composition may be reduced by mixing the composition with a colloidal gas aphron (CGA) fluid. Colloidal gas aphron fluid are stable bubbles, surrounded by a thin, multi-layered surfactant film. The small size of the aphrons creates a system with a high interfacial area which can be pumped like water without the bubbles collapsing. The high stability of colloidal aphrons is due to a thin, multi-layered shell surrounding the core, and high interfacial area make them of interest in many uses such as mineral processing, protein recovery, drilling fluids, separation of organic dyes from waste water, predispersed solvent extraction of dilute streams, clarification and purification of suspensions, soil remediation, material synthesis and immobilization of enzymes. See, for example, Molaei and Waters, Adv Colloid Interface Sci. 2015 February;216:36-54. doi: 10.1016/j.cis.2014.12.001. Epub 2014 Dec. 15.

In some embodiments, the SAP comprises cross-linked polyacrylamide, polyacrylate, or polyacrylamide-polyacrylate co-polymer. In some embodiments, a particle size of the hydrated SAP is a range of 0.1 to 5 millimeters. In some embodiments, the SAP comprises a cross-linked, charge-modified starch or cellulose. In some embodiments, a concentration of the SAP in the suspension is in a range of 0.1 to 5 pounds per US barrel (42 US gallons). In some embodiments, the SAP is hydrated using fresh water (total dissolved solids less than 2000 parts per million—ppm). In some embodiments, the SAP is susceptible to degradation by an oxidizing agent such as peracetic acid, ammonium persulfate, peroxide, or sodium persulfate.

In some embodiments, the salt tolerant osmotic barrier polymer comprises one or more of linear polyacrylamide, branched polyacrylamide, polyacrylamide-acrylamide tertiary butyl sulfonic acid co-polymer, xanthan gum, guar gum, derivatized guar gum, cellulose polymer, or derivatized cellulose polymer. In some embodiments, the salt tolerant osmotic barrier polymer can be any polymer that obtains a minimum viscosity of 100 cP at a 5.1 $sec^{-1}$ shear rate in fluids with greater than 2000 ppm total dissolved solutes (TDS). Preferably, the polymer results in viscosity greater than 400 cP under the foregoing shear and TDS conditions.

In some embodiments, the CGA comprises a mixture of at least one viscosifying polymer and at least one surfactant. In some embodiments, the at least one viscosifying polymer comprises xanthan gum. In some embodiments the at least one viscosifying polymer comprises one or more of linear polyacrylamide, branched polyacrylamide, or polyacrylamide-acrylamide tertiary butyl sulfonic acid co-polymer. In some embodiments, the at least one surfactant comprises at least one anionic, non-ionic, zwitterionic, or cationic surfactant.

In some embodiments, the SAP concentration in the suspension may be sufficient to absorb 50-80% of the free water in the predetermined volume of the pill or slug. The salt tolerant osmotic barrier polymer may be dosed at $\frac{1}{3}$ to $\frac{1}{10}$ the relative dosage of the SAP. For example, if, in order to absorb >50% of the water volume (e.g., 20 bbls), the SAP is dosed at 0.065 lbs/gal (55 lbs); then the salt tolerant osmotic barrier polymer may be dosed at 0.012-0.018 lbs/gal (10-15 lbs).

FIG. 1 shows an expanded view of part of a well drilled through and completed in subsurface formations. The part shown in FIG. 1 represents subsurface formation at 14. The subsurface formation illustrated by numeral 14 may be the formation itself, or may be, for example, proppant particles. Proppant particles in the part of the formation 14 radially proximate the well would be in the case that the subsurface formation 14 has been treated by hydraulic fracturing. The subsurface formation 14 may have a fluid pressure in its pore spaces below the hydrostatic pressure (excluding friction effects in the case of circulating fluid) of a fluid 40 being moved through the well. The fluid 40 may be a mixture comprising a slug or "pill" of a lost circulation material (LCM) composition 12 as explained herein having hydrated super absorbent polymer (SAP) particles 12B suspended in a salt-tolerant osmotic polymer barrier solution 12A. The higher fluid pressure in the well causes the LCM composition 12 to move toward the formation 14. Properties of the SAP particles 12B forced against the proppant or formation by hydrostatic pressure overburden result in formation of a filter cake, or agglomeration of SAP 12B 12B such that the filter cake is substantially impermeable to fluid movement between the well and the subsurface formation 14.

In cases where the formation fluid pressure is low enough that differential pressure between the well and the formation 14 would destroy the seal created by the hydrated SAP particles-osmotic barrier polymer, the fluid pressure in the well may be reduced by lowering its density. In some embodiments, the fluid 12 may be mixed with a colloidal gas aphron (CGA) 10 having a selected density low enough to reduce the well fluid pressure to within a safe differential above the formation fluid pressure.

Figure 2:
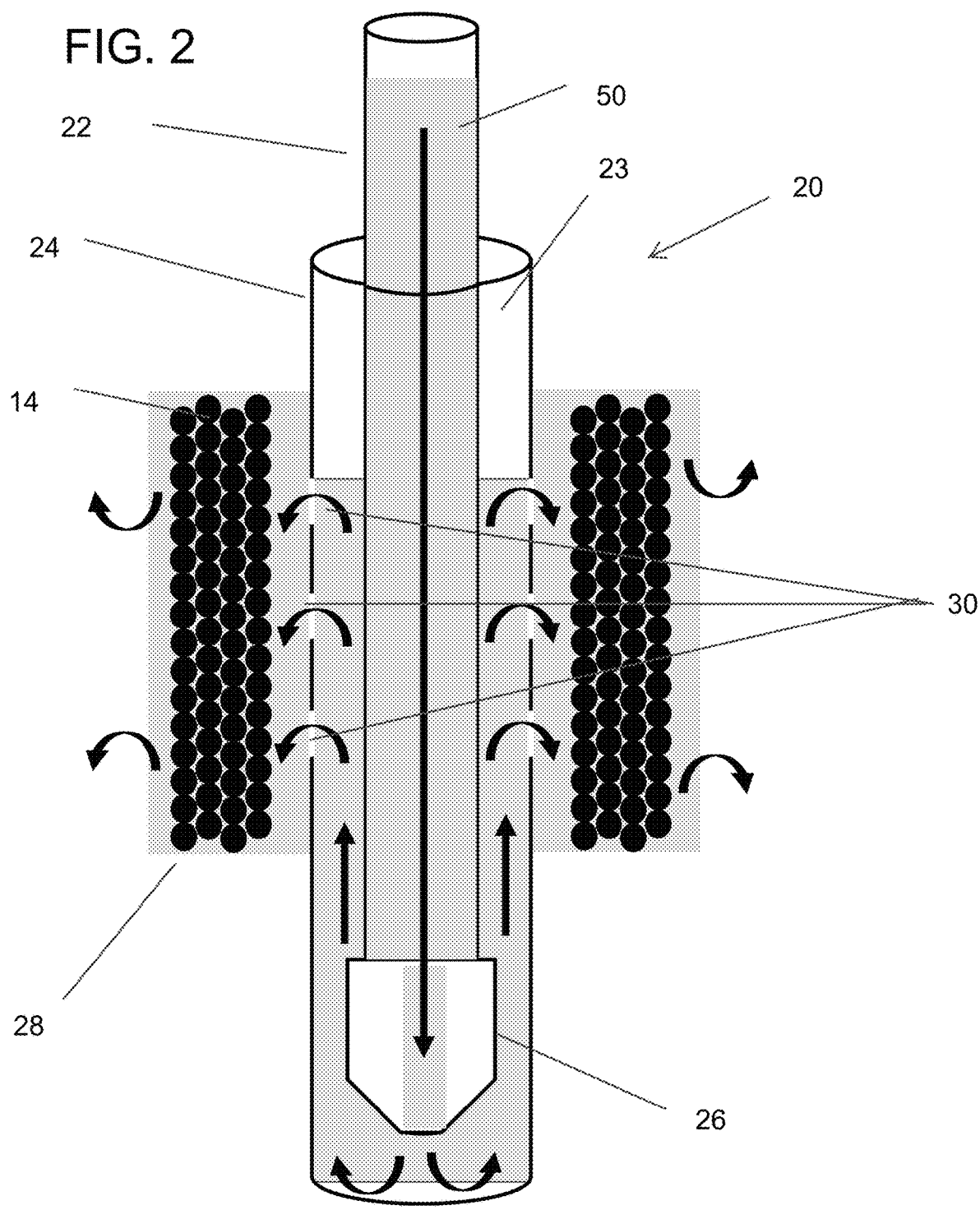
FIG. 2 shows schematically "forward" direction circulating well fluid in a well prior to placement of a "pill" of material according to the present disclosure.

FIG. 2 shows a larger part of the well as explained with reference to FIG. 1 to illustrate fluid circulation in the well (shown at 20 in FIGS. 2 through 5) prior to placement of the LCM composition (12 in FIG. 1). Direction of fluid movement is indicated by the arrows in the figure. Well intervention fluid 50 of any composition and type known in the art for use in well intervention may be pumped from surface through a tubing 22 inserted into the well 10 and nested within a liner or casing (explained below). The well intervention fluid 50 leaves the tubing 22 through a well tool 26 such as a drill bit, at the end of the tubing 22. The tubing 22 may be, for example and without limitation coiled tubing conveyed by and surface reel known in the art or a jointed tubing conveyed by a rig. The well intervention fluid 50 may comprise a CGA as explained with reference to FIG. 1 in cases where the well fluid pressure must be reduced below hydrostatic pressure of a column of fresh water (0.433 psi/ft).

A well pipe, liner or casing 24 is installed in the well 10 at the time well drilling is finished. The well intervention fluid 50 then moves through an annular space 23 between the tubing 22 and the casing 24 to return to the surface. The well pipe or casing 24 may have openings 30 to enable fluid movement from inside the well pipe or casing 24 to and from the subsurface formation 14. Such openings 30 may be perforations, slots, screens, sliding sleeves, or any other device known to enable fluid movement between the interior of a well and the adjacent formation outside the well. As shown in FIG. 2, if the fluid pressure in the formation 14 is lower than the fluid pressure in the well 20 proximate the openings 30, then some of the well intervention fluid 50 may move into the formation 14 and be lost.

Figure 3:
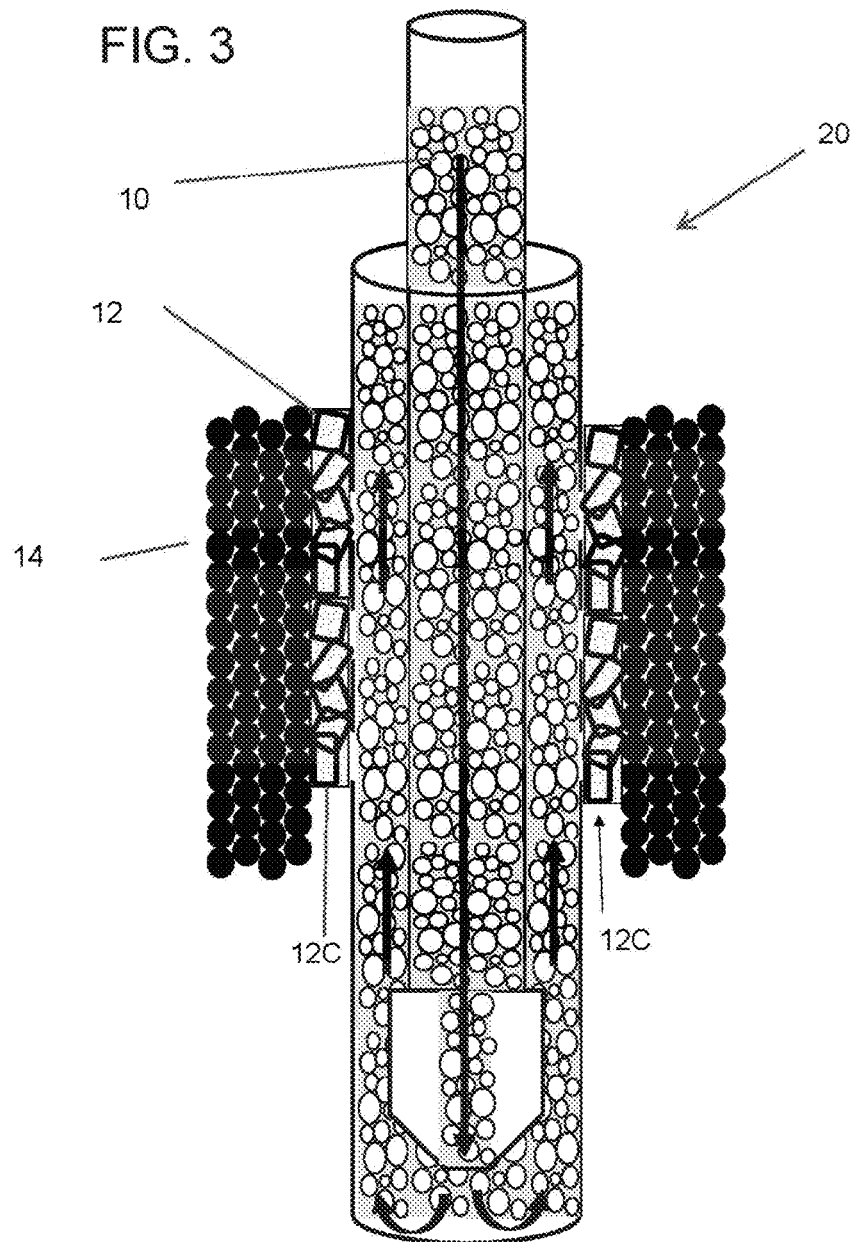
FIG. 3 shows placement of the pill in the well shown in FIG. 2.

As shown in FIG. 3, a slug, pill or other discrete volume of the LCM composition 12 may be prepared at surface and introduced into the tubing 22 and may be moved into the tubing 22 until it reaches the openings 30. Once the LCM composition 12 reaches the openings, the SAP particles (12B in FIG. 1) will form a filter cake 12C, reducing or fully stopping further loss of well fluid into the formation 14. The effectiveness of the LCM treatment may be is indicated by an increase in the pumping pressure of the fluid during or after placing the pill. An ideal effective seal will result in an increase of pumping pressure between 200 and 1000 psi, confirming a significant amount of resistance to fluid losses has been established by the pill. If an effective seal is not indicated after pumping the first selected volume of the LCM composition, the process can be repeated until such time as an effective seal is indicated by the pumping pressure.

Figure 4:
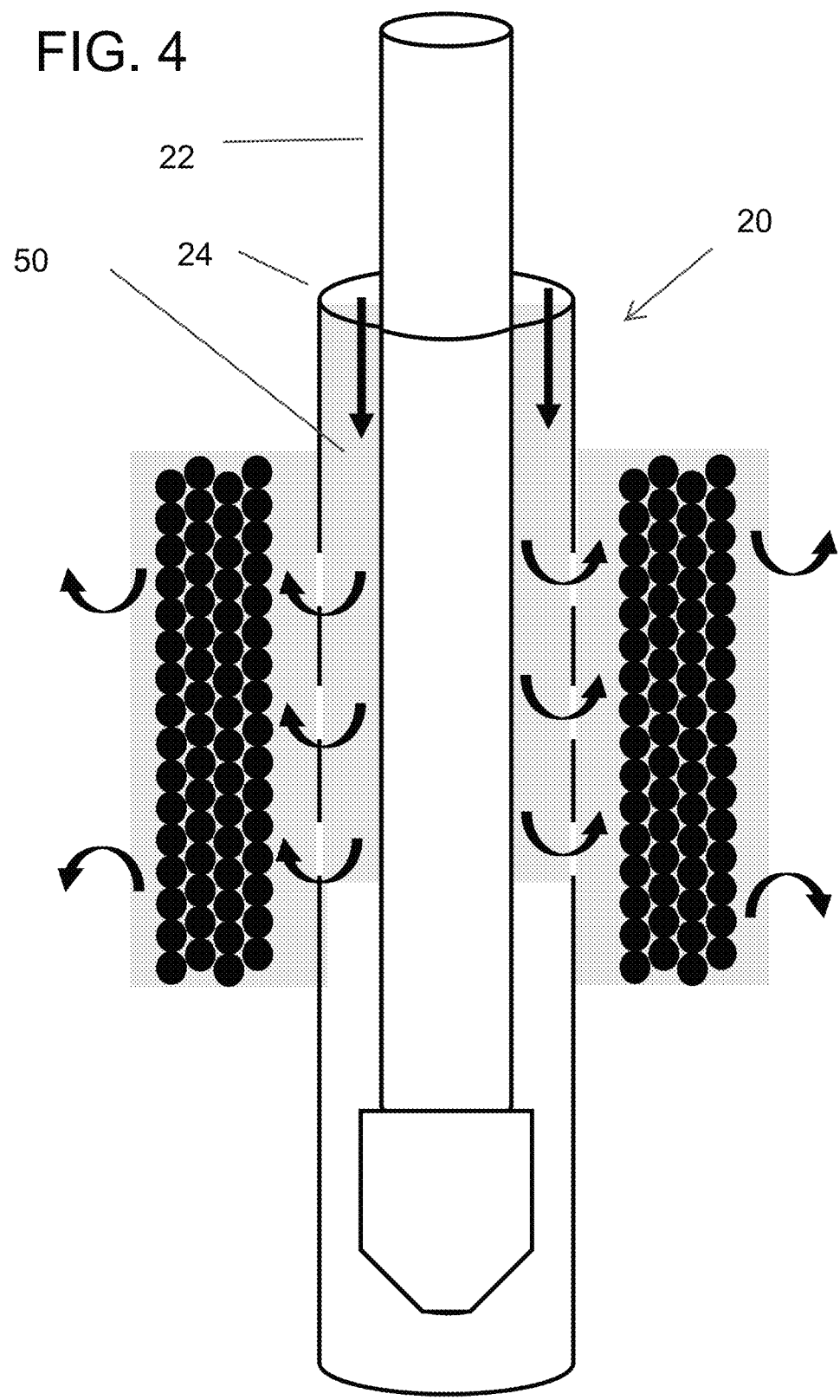

FIG. 4 shows all the elements shown in FIG. 2, wherein circulation of the well intervention fluid 50 is in the opposite direction to that shown in FIG. 2.

FIG. 5 shows all the elements shown in FIG. 3, wherein circulation of the well intervention fluid 50 is in the opposite direction to that shown in FIG. 3.

The LCM composition 12 may in some cases be removed from the well by reducing pressure in the well further to cause movement of formation fluid into the well. Because formation fluid in most cases includes saline water, the SAP particles (12B in FIG. 1) will be dehydrated, reduce in size and be moved into the well for transport to surface by the entering formation fluid. In the event the SAP particles cannot be or otherwise do not dehydrate, they may be removed by introducing an oxidizing agent into the well.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A method for stopping fluid loss from a well into a formation penetrated by the well, comprising:
   pumping a selected volume of a composition into the well until the selected volume is adjacent to the formation, wherein the composition comprises:
   particles of a hydrated superabsorbent polymer (SAP) mixed with an aqueous solution of a salt tolerant osmotic barrier polymer to form a suspension;
   wherein the salt tolerant osmotic barrier polymer comprises one or more of linear polyacrylamide, branched polyacrylamide, polyacrylamide-acrylamide tertiary butyl sulfonic acid co-polymer, xanthan gum, guar gum, derivatized guar gum, cellulose polymer, or derivatized cellulose polymers; and
   mixing a colloidal gas aphron (CGA) with the composition to reduce a density of the composition.

2. The method of claim 1, wherein effectiveness of the selected volume of the composition stopping fluid loss into the formation is determined by observing an increase in pumping pressure of 200 to 1000 pounds per square inch.

3. The method of claim 1, further comprising removing the composition from the well.

4. The method of claim 3, wherein the removing comprises reducing a fluid pressure in the well to cause fluid in the formation to enter the well.

5. The method of claim 3, wherein the removing comprises pumping an oxidizing agent into the well until the oxidizing agent contacts the composition.

6. The method of claim 5, wherein the oxidizing agent comprises one or more of peracetic acid, ammonium persulfate, or sodium persulfate.

7. The method of claim 1, wherein the SAP comprises cross-linked polyacrylamide-polyacrylate copolymer.

8. The method of claim 1 wherein the CGA comprises a mixture of at least one viscosifying polymer and at least one surfactant.

9. The method of claim 8, wherein the at least one viscosifying polymer comprises xanthan gum.

10. The method of claim 8, wherein the at least one surfactant comprises at least one of an anionic surfactant, a non-ionic surfactant, a zwitterionic surfactant, or a cationic surfactant.

11. The method of claim 1, wherein the salt tolerant osmotic barrier polymer comprises polyacrylamide-acrylamide tertiary butyl sulfonic acid co-polymer.

12. A method for stopping fluid loss from a well into a formation penetrated by the well, comprising:
   pumping a selected volume of a composition into the well until the selected volume is adjacent to the formation, wherein the composition comprises:
   particles of a hydrated superabsorbent polymer (SAP) mixed with an aqueous solution of a salt tolerant osmotic barrier polymer to form a suspension;
   wherein the salt tolerant osmotic barrier polymer comprises polyacrylamide-acrylamide tertiary butyl sulfonic acid co-polymer; and
   mixing a colloidal gas aphron (CGA) with the composition to reduce a density of the composition.

13. The method of claim 12, wherein effectiveness of the selected volume of the composition stopping fluid loss into the formation is determined by observing an increase in pumping pressure of 200 to 1000 pounds per square inch.

14. The method of claim 12, further comprising removing the composition from the well.

15. The method of claim 14, wherein the removing comprises reducing a fluid pressure in the well to cause fluid in the formation to enter the well.

16. The method of claim 14, wherein the removing comprises pumping an oxidizing agent into the well until the oxidizing agent contacts the composition.

17. The method of claim 16, wherein the oxidizing agent comprises one or more of peracetic acid, ammonium persulfate, or sodium persulfate.

18. The method of claim 12, wherein the SAP comprises cross-linked polyacrylamide-polyacrylate copolymer.

19. The method of claim 12 wherein the CGA comprises a mixture of at least one viscosifying polymer and at least one surfactant.

20. The method of claim 19, wherein the at least one viscosifying polymer comprises xanthan gum.

21. The method of claim 19, wherein the at least one surfactant comprises at least one of an anionic surfactant, a non-ionic surfactant, a zwitterionic surfactant, or a cationic surfactant.

22. A method for stopping fluid loss from a well into a formation penetrated by the well, comprising:
pumping a selected volume of a composition into the well until the selected volume is adjacent to the formation, wherein the composition comprises:
particles of a hydrated superabsorbent polymer (SAP) mixed with an aqueous solution of a salt tolerant osmotic barrier polymer to form a suspension;
wherein the salt tolerant osmotic barrier polymer has a minimum viscosity of 100 centipoise at a 5.1 $\sec^{-1}$ shear rate in fluids with greater than 2000 parts per million total dissolved solutes (TDS);
wherein the salt tolerant osmotic barrier polymer comprises one or more of linear polyacrylamide, branched polyacrylamide, polyacrylamide-acrylamide tertiary butyl sulfonic acid co-polymer, xanthan gum, guar gum, derivatized guar gum, cellulose polymer, or derivatized cellulose polymer; and
mixing a colloidal gas aphron (CGA) with the composition to reduce a density of the composition.

23. The method of claim 22, wherein effectiveness of the selected volume of the composition stopping fluid loss into the formation is determined by observing an increase in pumping pressure of 200 to 1000 pounds per square inch.

24. The method of claim 23, further comprising removing the composition from the well.

25. The method of claim 24, wherein the removing comprises reducing a fluid pressure in the well to cause fluid in the formation to enter the well.

26. The method of claim 24, wherein the removing comprises pumping an oxidizing agent into the well until the oxidizing agent contacts the composition.

27. The method of claim 26, wherein the oxidizing agent comprises one or more of peracetic acid, ammonium persulfate, or sodium persulfate.

* * * * *